(12) United States Patent
Akkala

(10) Patent No.: US 6,283,067 B1
(45) Date of Patent: Sep. 4, 2001

(54) POTABLE WATER TEMPERATURE MANAGEMENT SYSTEM

(75) Inventor: Marc W. Akkala, Cedarburg, WI (US)

(73) Assignee: AOS Holding Company, Wilmington, DE (US)

( * ) Notice: Subject to any disclaimer, the term of this patent is extended or adjusted under 35 U.S.C. 154(b) by 0 days.

(21) Appl. No.: 09/439,526

(22) Filed: Nov. 12, 1999

(51) Int. Cl.[7] .................................................... F22B 1/16
(52) U.S. Cl. .................. 122/14.22; 122/15.1; 122/18.1; 122/18.31; 122/20 R; 122/31.1
(58) Field of Search ............................... 122/13.01, 14.1, 122/14.22, 15.1, 18.1, 18.3, 18.31, 31.1, 20 R; 237/19

(56) References Cited

U.S. PATENT DOCUMENTS

| | | | |
|---|---|---|---|
| 3,896,992 | * 7/1975 | Borovina et al. | 237/19 |
| 4,178,907 | * 12/1979 | Sweat, Jr. | 122/20 B |
| 4,210,102 | * 7/1980 | Dosmann | 122/20 |
| 4,241,588 | * 12/1980 | Murphy et al. | 62/238 |
| 4,401,261 | * 8/1983 | Brown | 236/10 |
| 4,406,402 | * 9/1983 | Henriques | 237/19 |
| 4,699,091 | * 10/1987 | Waters | 122/20 |
| 4,745,757 | * 5/1988 | Kim | 60/667 |
| 4,821,682 | * 4/1989 | Waters | 122/20 |
| 5,228,413 | * 7/1993 | Tam | 122/17 |
| 5,313,914 | * 5/1994 | Woollen | 122/13.1 |
| 5,372,185 | * 12/1994 | Lannes | 122/14 |
| 5,432,710 | * 7/1995 | Ishimaru et al. | 364/493 |
| 5,437,264 | * 8/1995 | McCormick | 126/364 |
| 5,596,952 | * 1/1997 | Lannes et al. | 122/13.1 |
| 5,758,820 | * 6/1998 | Celorier, Jr. et al. | 237/2 |

* cited by examiner

Primary Examiner—Gregory Wilson
(74) Attorney, Agent, or Firm—Michael Best & Friedrich LLP

(57) ABSTRACT

A potable water temperature management system includes a device that produces waste heat and that has a primary purpose other than heating potable water. The waste heat from the device is used to heat potable water in a tank. A heat shedding system is activated when the temperature of the potable water in the tank exceeds a selected maximum temperature. An auxiliary energy transfer system may be activated to heat the potable water in the tank when the potable water in the tank falls below a selected minimum temperature. A controller may be used to monitor the temperature of the potable water in the tank and activate either the heat shedding system or the auxiliary energy transfer system based on the potable water temperature.

32 Claims, 3 Drawing Sheets

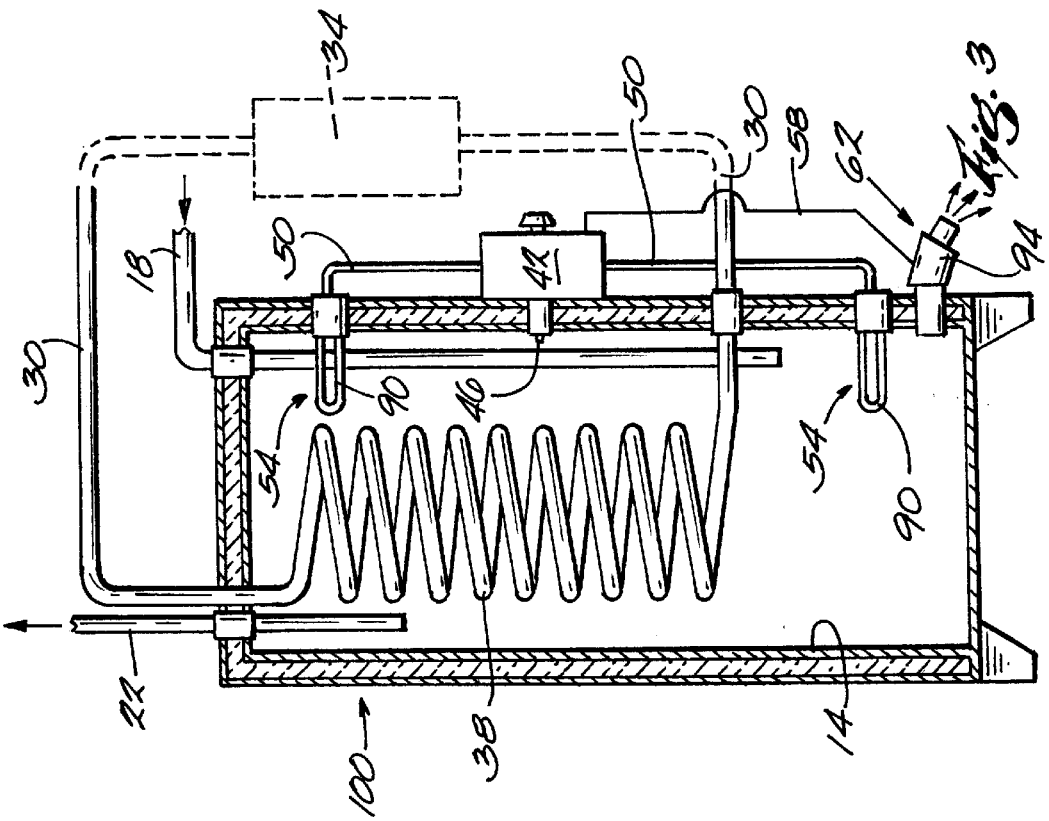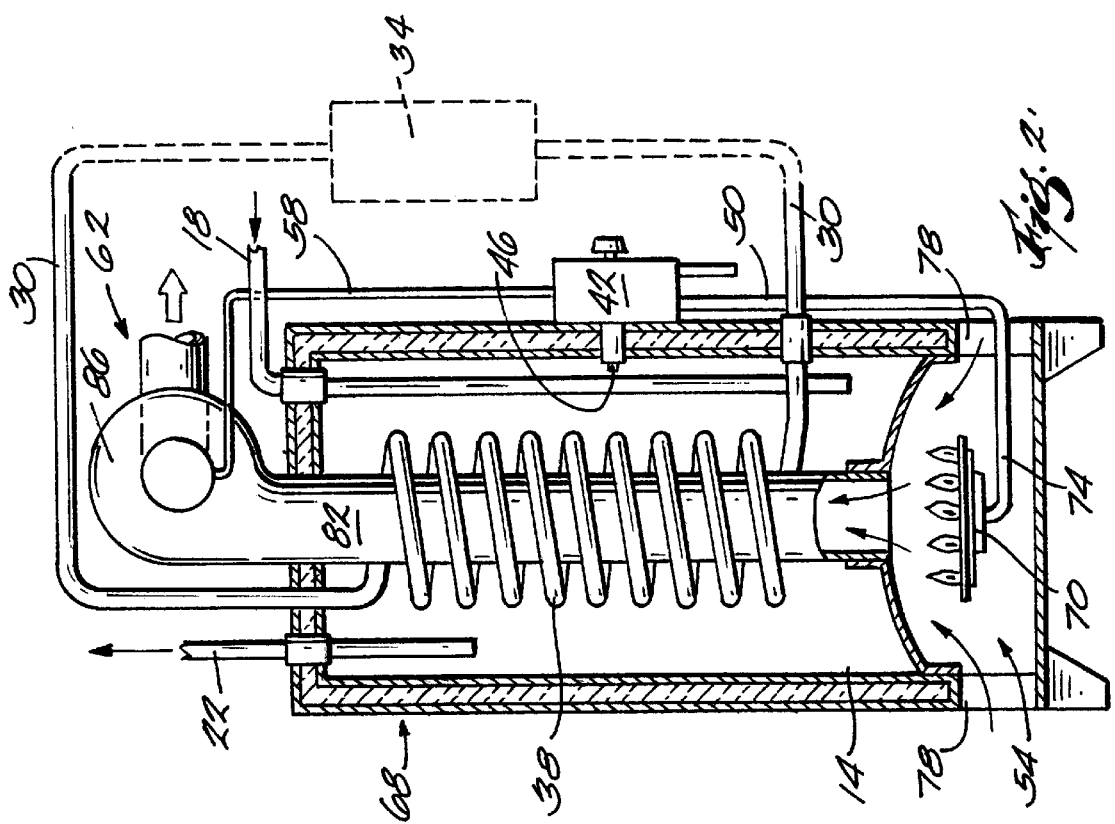

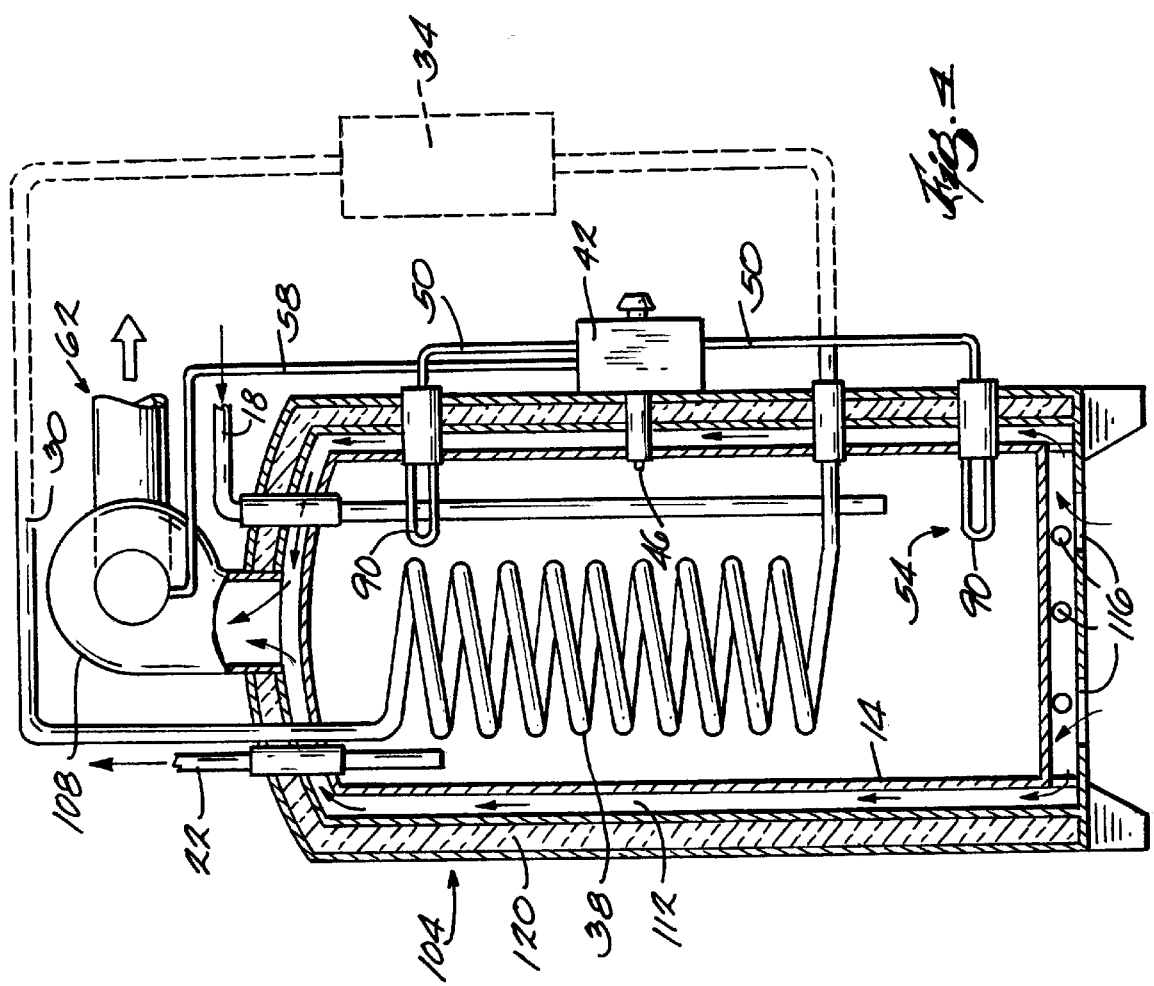

POTABLE WATER TEMPERATURE MANAGEMENT SYSTEM

FIELD OF THE INVENTION

The invention relates to a system for managing the temperature of potable water in a water heater.

BACKGROUND

In known storage-type water heaters, potable water is commonly heated inside a holding tank with either a gas heater or an electric heating element. The temperature of the water is usually monitored with a thermostat that is operatively interconnected with the source of gas for the gas heater, or the source of electricity for the electric heating element. In order to conserve energy and fuel, the gas heater or electric heating element is actuated only when the temperature of the water falls below a selected minimum temperature.

SUMMARY

The present invention provides a potable water temperature management system including a tank containing potable water, a device that generates waste heat and that has a primary purpose other than heating the potable water in the tank, a heat exchanger using the waste heat to heat the potable water in the tank, and a heat shedding system for shedding heat from the potable water in the tank. A controller may be used to monitor the temperature of the potable water in the tank and actuate the heat shedding system in response to the temperature of the potable water in the tank exceeding a selected temperature.

Preferably, the device that generates waste heat is either a heat pump or a fuel cell. Preferably, the heat exchanger includes a conduit that extends into the tank, and is shaped as a coil. Preferably, the heat shedding system includes either a blower that draws air through a flue in the tank, or a drain that permits the flow of hot potable water from the tank. A cold potable water inlet conduit communicates with the tank and delivers cold potable water to the tank at a head pressure. When a faucet is opened upstream of the water heater, the head pressure forces hot potable water from the tank and replaces it with cold potable water. Preferably, the potable water temperature management system also includes an auxiliary energy transfer system, such as a gas burner or electric element, for selectively providing heat to the potable water in the tank in addition to the heat provided by the heat exchange conduit.

The invention also provides a method for modifying a conventional water heater. The method preferably includes the steps of heating the potable water in the tank with the waste heat, and shedding heat from the potable water in the tank in response to the temperature of the potable water in the tank exceeding a selected temperature. A controller may be provided to monitor the temperature of the potable water in the tank, and actuate the heat shedding system.

One feature of the present invention is to use waste heat from a device to heat potable water. Thus, heat that may otherwise be wasted is put to a useful purpose through the present invention.

Another feature of the present invention is to provide a unified system that heats potable water and performs at least one other function. For example, a fuel cell may be used to provide electricity to a residence, and the waste heat from the fuel cell may be used to heat potable water. Another example includes the use of a heat pump for cooling a residence, and using the waste heat from the heat pump to heat potable water. Regardless of the type of device used in conjunction with the water heater, the present invention creates a potential savings in natural resources or energy that would otherwise be used to separately heat the potable water.

Other features and advantages of the invention will become apparent to those skilled in the art upon review of the following detailed description, claims, and drawings.

BRIEF DESCRIPTION OF THE DRAWINGS

FIG. 2 is a cross-section view of a first embodiment of the present invention.

FIG. 3 is a cross-section view of an alternative embodiment of the present invention.

FIG. 4 is a cross-section view of another alternative embodiment of the present invention.

Figure 1:
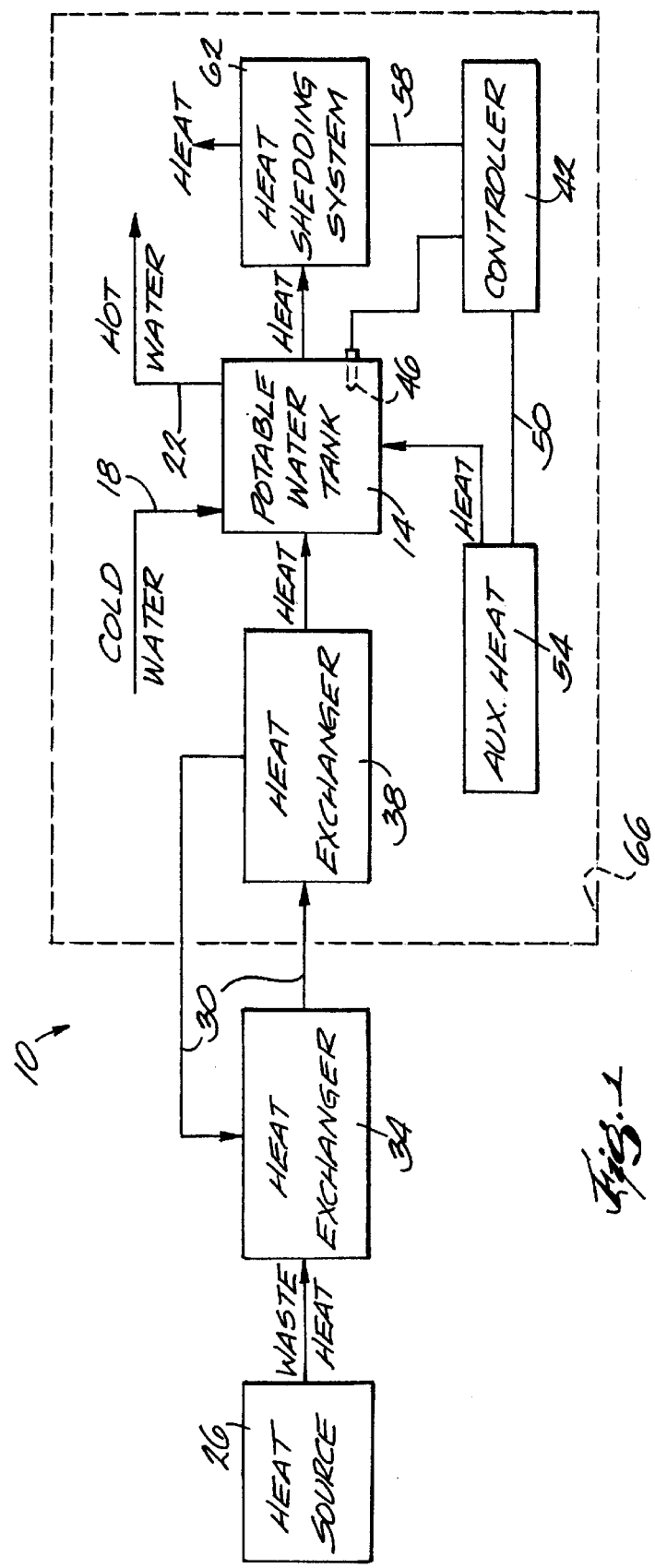
FIG. 1 is a schematic illustration of a potable water temperature management system embodying the present invention.

Before one embodiment of the invention is explained in detail, it is to be understood that the invention is not limited in its application to the details of construction and the arrangements of the components set forth in the following description or illustrated in the drawings. The invention is capable of other embodiments and of being practiced or being carried out in various ways. Also, it is understood that the phraseology and terminology used herein is for the purpose of description and should not be regarded as limiting. The use of "including" and "comprising" and variations thereof herein is meant to encompass the items listed thereafter and equivalents thereof as well as additional items. The use of "consisting of" and variations thereof herein is meant to encompass only the items listed thereafter. The use of letters to identify steps of a method or process is simply for identification and is not meant to indicate that the steps should be performed in a particular order.

DETAILED DESCRIPTION

FIG. 1 schematically illustrates a potable water temperature management system 10 including a tank 14 containing potable water. The tank 14 includes a cold potable water inlet 18 for providing cold potable water to the tank 14, and a hot potable water outlet 22 for providing hot potable water from the tank 14 on demand. The cold potable water is provided at a head pressure or water pressure, and pressurizes the potable water in the tank 14. When a water faucet or other valve communicating with the tank 14 is opened, the pressure provided by the cold potable water forces hot potable water from the tank through the hot potable water outlet 22 and the open valve, and replaces the displaced hot potable water with cold potable water.

The system 10 also includes a device 26 that produces waste heat, and that has a primary purpose other than heating potable water. For example, the device 26 may be a fuel cell that has a primary purpose of producing electricity, or a heat pump that has a primary purpose of cooling a space, such as the inside of a house. The waste heat produced by the device 26 may be a by-product of the primary function of the device 26, or, if the primary function of the device 26 is to produce heat (e.g., a furnace), the waste heat may be excess heat produced by the device 26.

The system 10 further includes a heat exchange conduit 30 conducting a flow of a medium (e.g., glycol). The heat exchange conduit 30 extends through a first heat exchanger 24, where the waste heat from the device 26 heats the medium in the heat exchange conduit 30. The first heat exchanger 24 may be internal or external of the device 26, and may, for example, include a portion of the conduit 30 passing near the waste heat exhaust. The heat exchange conduit 30 conducts the flow of medium in a loop between the first heat exchanger 34 and a second heat exchanger 38. The flow of heated medium passing out of the first heat exchanger 34 flows into the second heat exchanger 38, which may be outside or inside the potable water tank 14. At the second heat exchanger 38, the potable water is heated by the flow of medium. Preferably, the second heat exchanger 38 includes a coiled portion of the heat exchange conduit 30 extending into the tank 14.

A controller 42 is mounted near or on the tank 14, and includes a thermometer or thermostat 46 that measures or responds to the temperature of the potable water in the tank 14. An electrical wire or gas, conduit 50 extends from the controller 42 to an auxiliary energy transfer system or auxiliary heater 54. The auxiliary energy transfer system 54 is actuated by the controller 42 when the potable water temperature in the tank 14 falls below a selected minimum temperature. The controller 42 is also interconnected via an actuating conduit 58 with a heat shedding system 62 that decreases the temperature of the potable water in the tank 14. The controller 42 activates the heat shedding system 62 when the temperature of the potable water in the tank 14 rises above a selected maximum temperature.

During operation of the device 26, the potable water in the tank 14 is constantly heated by the waste heat and medium through the first and second heat exchangers 34, 38 until the water temperature reaches the maximum temperature. Then the controller 42 activates the heat shedding system 62 to cool the potable water temperature. This is different from most known water heating systems in which a heater is activated only when the potable water temperature falls below a selected minimum temperature. In such known water heaters, a heater is activated to heat the water temperature to a selected maximum temperature and is then deactivated. The present system 10 includes the auxiliary energy transfer system 54 which is used only when the device 26 does not produce enough waste heat to maintain the water temperature above the selected minimum temperature.

FIGS. 2–4 illustrate particular constructions of the portion of the system 10 enclosed by the broken line 66 in FIG. 1. Although FIGS. 2–4 illustrate particular constructions, other alternative constructions are possible as well.

FIG. 2 illustrates a water heater 68 embodying the invention. In the water heater 68, the auxiliary energy transfer system 54 includes a gas burner 70 that bums gas fuel provided by a gas manifold tube 74 and air provided by an air intake 78. The products of combustion pass through a flue 82 extending through the potable water in the tank 14, and heat from the gases in the flue is conducted to the water in the tank and thereby heats the water. The heat shedding system 62 includes a blower or fan 86 that draws air through the air intake 78, up through the flue 82, and out a chimney (not shown). When the fan 86 is operated without the gas burner 70 producing heat, heat from water in the tank 14 is conducted by the flue walls and is carried away by the air drawn through the flue 82, cooling the potable water in the tank 14. In this regard, the flue 82 is part of both the heat shedding system 62 and the auxiliary energy transfer system 54 in this construction. In the water heater 68, the heat exchange conduit 38 is coiled around the flue 82 inside the tank 14. Alternatively, the heat exchange conduit 38 may extend into the tank 14 and not coil around the flue 82, or may be disposed outside of the tank to conduct heat through the tank wall.

As will be understood by those skilled in the art, the water heater 68 is a conventional power-vented gas water heater with the addition of the heat exchange conduit 38. If the conventional gas water heater were not power-vented, then the fan 86 and conduit 58 would be additional features as well. Although some type of controller 42 is typically used in conjunction with the thermostat 46 and burner 70 in conventional gas water heaters, some modifications and/or reprogramming may have to be done to a conventional controller 42 to make it actuate the fan 86 without actuating the burner 70 when the potable water temperature in the tank reaches the selected maximum temperature.

FIG. 3 illustrates an alternative water heater 100 embodying the invention. In the water heater 100, the auxiliary energy transfer system 54 includes at least one electric heating element 90, and may include a plurality of electric heating elements 90. The illustrated heat shedding system 62 includes a drain 94 communicating with the tank 14 to permit the flow of hot water from the tank 14. The drain 94 may alternatively be positioned near the top of the tank 14 or have a conduit extending from the drain 94 up through the water in the tank to drain the hottest water from the tank 14. Alternatively, the drain 94 may communicate with the hot water outlet 22. The cold water inlet 18 introduces cold water into the tank 14 to replace the hot water drained through the drain 94, cooling the potable water in the tank 14. The drain 94 and heating coils 90 are actuated by the controller 42. Although the heat exchange conduit 38 is formed as a coil within tank 14 of the water heater 100, the heat exchange conduit 38 may alternatively extend into the tank 14 without being formed as a coil, or may be disposed outside of the tank to conduct heat through the tank wall.

As will be understood by those skilled in the art, the water heater 100 is a conventional electric water heater with the addition o f the heat exchange conduit 38 and actuating conduit 58. It is not unusual for a conventional electric water heater to include a drain 94, but the drain 94 would probably have to be modified to be operable by the controller 42, and would be an additional element where one is not included. Although some type of controller 42 is typically used in conjunction with the thermostat 46 and heating elements 90 in conventional electric water heaters, some modifications and/or reprogramming may have to be done to a conventional controller 42 to make it actuate the drain 94 when the potable water temperature in the tank reaches the selected maximum temperature.

It should be noted that the heat shedding system 62 illustrated in FIG. 2 could be incorporated into the water heater of FIG. 3, and vice-versa. For example, the electric heating elements 90 could be used in a water heater having a flue 82 and fan 86, in which case the gas burner 70 may not be necessary. Also, the gas heater 70 and flue 82 may be used in a water heater having a drain 94, in which case, the fan 86 may not be necessary.

FIG. 4 illustrates another alternative water heater 104 embodying the invention. The water heater 104 includes a similar auxiliary energy transfer system 54 to the auxiliary energy transfer system 54 illustrated in FIG. 3. The heat shedding system 62 in this embodiment includes a fan 108 communicating with an annular air flow passage 112 surrounding the tank 14. When the water temperature within the tank 14 reaches the predetermined maximum temperature, the controller activates the fan 108, which draws air through inlets 116 in the bottom portion of the water heater 104. The air flows through the annular passage 112 and draws heat from the tank 14, thus cooling the potable water in the tank. Alternatively, the annular passage 112 may include a passage that does not entirely surround the water tank 14, or may include a plurality of passages. The inlets 116 may alternatively be provided through the insulation jacket 120 of the water heater 104.

The heat shedding system 62 illustrated in FIG. 4 may also be incorporated in a gas-fired water heater, in which case the water heater flue may be the same or distinct from the annular air flow passage 112. Also, the fan 108 may communicate with the water heater flue to provide powered ventilation, or may only communicate with the annular passage 112 for the purpose of heat shedding. Alternatively, separate fans may communicate with the flue and annular passage 112.

What is claimed is:

1. A potable water temperature management system comprising:
    a tank containing potable water;
    a cold potable water inlet conduit communicating with said tank to deliver cold potable water to said tank;
    a hot potable water outlet conduit communicating with said tank for the delivery of hot potable water from said tank upon demand;
    a device having a primary purpose other than heating the potable water in said tank, said device generating waste heat;
    a heat exchanger for using the waste heat to heat the potable water in said tank; and
    a heat shedding system for shedding heat from the potable water in said tank.

2. The system of claim 1, wherein said heat exchanger includes a heat exchange conduit conducting a flow of medium heated by the waste heat for the exchange of heat from the medium to the potable water in said tank.

3. The system of claim 1, further comprising a controller for monitoring the temperature of the potable water in said tank and actuating said heat shedding system in response to the temperature of the potable water in said tank exceeding a selected temperature.

4. The system of claim 1, wherein said device is a heat pump having a primary purpose of cooling a space.

5. The system of claim 1, wherein said device is a fuel cell having a primary purpose of generating electricity.

6. The system of claim 1, wherein at least a portion of said heat exchanger extends into said tank, and is shaped as a coil.

7. The system of claim 1, wherein said tank includes a flue extending through the potable water in said tank, and wherein said heat shedding system includes a blower communicating with said flue to create a flow of air through said flue to cause heat transfer from the potable water in said tank to the flow of air and decrease the temperature of the potable water in said tank.

8. The system of claim 1, wherein said tank includes an air flow passage communicating with an outer surface of said tank, and wherein said heat shedding system includes a blower communicating with said air flow passage to create a flow of air through said air flow passage to cause heat transfer from the potable water in said tank to the flow of air and decrease the temperature of the potable water in said tank.

9. The system of claim 1, wherein said heat shedding system includes a water drain communicating with the potable water in said tank to permit the flow of potable water from said tank, said cold potable water inlet conduit supplying cold potable water to replace the potable water flowing from said tank to decrease the temperature of the potable water in said tank.

10. The system of claim 1, further comprising an auxiliary energy transfer system for providing heat to the potable water in said tank in addition to the heat provided by said heat exchanger.

11. The system of claim 10, wherein said auxiliary energy transfer system includes a gas burner and a flue extending at least partially through the potable water in said tank such that hot products of combustion produced by said gas burner pass through said flue and heat the potable water in said tank.

12. The system of claim 11, wherein said heat shedding system includes a blower communicating with said flue to create a flow of air through said flue to cause heat transfer from the potable water in said tank to the flow of air and decrease the temperature of the potable water in said tank.

13. The system of claim 10, wherein said auxiliary energy transfer system includes an electrical element extending into said tank to heat the potable water in said tank.

14. The system of claim 13, wherein said heat shedding system includes a water drain communicating with the potable water in said tank to permit the flow of potable water from said tank, said cold potable water inlet conduit supplying cold potable water to replace the potable water flowing from said tank to decrease the temperature of the potable water in said tank.

15. A method for modifying a water heater having a tank containing potable water, the method comprising the steps of:
    (a) providing a device having a primary purpose other than heating the potable water in the tank, the device generating waste heat;
    (b) heating the potable water in the tank with the waste heat; and
    (c) shedding heat from the potable water in the tank when the temperature of the potable water in the tank exceeds a selected temperature.

16. The method of claim 15, wherein step (a) includes providing a heat pump having a primary purpose of cooling a space, the heat pump also producing the waste heat.

17. The method of claim 15, wherein step (a) includes providing a fuel cell having a primary purpose of generating electricity, the fuel cell also producing the waste heat.

18. The method of claim 15, wherein step (b) includes providing a heat exchange conduit having a portion shaped as a coil, and extending at least a portion of the coil portion of the heat exchange conduit into the tank.

19. The system of claim 15, wherein the tank includes a flue extending through the potable water in the tank, and wherein step (c) includes providing a blower communicating with the flue, and creating a flow of air through the flue with the blower to cause heat transfer from the potable water in the tank to the flow of air and decrease the temperature of the potable water in the tank.

20. The system of claim 15, wherein step (c) includes providing a water drain communicating with the potable water in the tank to permit the flow of potable water from the tank, and draining some of the potable water from the tank through the drain.

21. A water heater comprising:
    a tank containing potable water;
    a cold potable water inlet conduit communicating with said tank to deliver cold potable water to said tank;

a hot potable water outlet conduit communicating with said tank for the delivery of hot potable water from said tank upon demand; and a heat shedding system for shedding heat from the potable water in said tank in response to the temperature of the potable water in said tank exceeding a selected temperature.

22. The water heater of claim 21, further comprising a heat pump having a primary purpose of cooling a space, said heat pump producing waste heat for heating the potable water in said tank.

23. The water heater of clam 21, further comprising a fuel cell having a primary purpose of generating electricity, said fuel cell producing waste heat for heating the potable water in said tank.

24. The water heater of claim 21, further comprising a controller for monitoring the temperature of the potable water in said tank, and for actuating said heat shedding system in response to the temperature of the potable water in said tank exceeding a selected temperature.

25. The water heater of claim 21, wherein said tank includes a flue extending through the potable water in said tank, and wherein said heat shedding system includes a blower communicating with said flue to create a flow of air through said flue to cause heat transfer from the potable water in said tank to the flow of air and decrease the temperature of the potable water in said tank.

26. The water heater of claim 21, wherein said tank includes an air flow passage communicating with an outer surface of said tank, and wherein said heat shedding system includes a blower communicating with said air flow passage to create a flow of air through said air flow passage to cause heat transfer from the potable water in said tank to the flow of air and decrease the temperature of the potable water in said tank.

27. The water heater of claim 21, wherein said heat shedding system includes a water drain communicating with the potable water in said tank to permit the flow of potable water from said tank, and wherein said cold potable water inlet conduit supplies cold potable water to said tank to replace the potable water flowing from said tank and to decrease the temperature of the potable water in said tank.

28. The water heater of claim 21, further comprising an auxiliary energy transfer system for providing heat to the potable water in said tank when the temperature of the potable water in said tank falls below a selected temperature.

29. The water heater of claim 28, wherein said auxiliary energy transfer system includes a gas burner and a flue extending at least partially through the potable water in said tank such that hot products of combustion produced by said gas burner pass through said flue and heat the potable water in said tank.

30. The water heater of claim 29, wherein said heat shedding system includes a blower communicating with said flue to create a flow of air through said flue to cause heat transfer from the potable water in said tank to the flow of air and decrease the temperature of the potable water in said tank.

31. The water heater of claim 28, wherein said auxiliary energy transfer system includes an electrical element extending into said tank to heat the potable water in said tank.

32. The water heater of claim 31, wherein said heat shedding system includes a water drain communicating with the potable water in said tank to permit the flow of potable water from said tank, and wherein said cold potable water inlet conduit supplies cold potable water to replace the potable water flowing from said tank and to decrease the temperature of the potable water in said tank.

\* \* \* \* \*